United States Patent
Yamazaki

(10) Patent No.: US 9,494,842 B2
(45) Date of Patent: Nov. 15, 2016

(54) ELECTROPHORETIC MATERIAL, ELECTROPHORESIS DISPLAY DEVICE, AND ELECTRONIC APPARATUS

(71) Applicant: SEIKO EPSON CORPORATION, Tokyo (JP)

(72) Inventor: Yasushi Yamazaki, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 48 days.

(21) Appl. No.: 14/573,685

(22) Filed: Dec. 17, 2014

(65) Prior Publication Data

US 2015/0102273 A1  Apr. 16, 2015

Related U.S. Application Data

(63) Continuation of application No. 13/937,653, filed on Jul. 9, 2013, now Pat. No. 8,947,763.

(30) Foreign Application Priority Data

Jul. 13, 2012  (JP) ................................. 2012-157224

(51) Int. Cl.
| | |
|---|---|
| G02B 26/00 | (2006.01) |
| G09G 3/34 | (2006.01) |
| G02F 1/167 | (2006.01) |
| G02F 1/00 | (2006.01) |
| G02B 26/02 | (2006.01) |
| G02F 1/17 | (2006.01) |

(52) U.S. Cl.
CPC ............ *G02F 1/167* (2013.01); *G02B 26/026* (2013.01); *G02F 1/0009* (2013.01); *G09G 3/344* (2013.01); *G02F 1/172* (2013.01); *G02F 2001/1678* (2013.01); *G09G 3/34* (2013.01); *G09G 3/3453* (2013.01)

(58) Field of Classification Search
CPC ................. G02F 1/0009; G02F 1/167; G02F 2001/1678; G02F 1/01; G02F 1/172; G02B 26/00; G02B 26/026; G09G 3/34; G09G 3/344; G09G 3/3453; G03G 15/0121; G03G 15/10
USPC ............................ 359/296; 345/107; 430/32
See application file for complete search history.

(56) References Cited

U.S. PATENT DOCUMENTS

| | | | |
|---|---|---|---|
| 6,600,890 B2 | 7/2003 | Hosoya et al. | |
| 6,725,006 B2 | 4/2004 | Hosoya et al. | |
| 8,947,763 B2 * | 2/2015 | Yamazaki | G02F 1/0009 345/107 |
| 2005/0024710 A1 | 2/2005 | Kanbe | |
| 2006/0284829 A1 | 12/2006 | Moriyama et al. | |

FOREIGN PATENT DOCUMENTS

| | | |
|---|---|---|
| JP | A-2002-287179 | 10/2002 |
| JP | A-2005-031541 | 2/2005 |

(Continued)

*Primary Examiner* — Loha Ben
(74) *Attorney, Agent, or Firm* — Oliff PLC

(57) ABSTRACT

In an electrophoretic material, first particles which are charged with a first polarity and second particles which are charged with a second polarity are dispersed in a solvent. A volume, which is obtained by dividing a volume of the solvent by a total number of particles, is called free volume, and a radius of a spherical space, which is occupied by sum of an average volume of the particles and the free volume, is called a free volume radius. A first particle average radius is greater than a second particle average radius. A difference between the free volume radius and the first particle average radius is greater than the second particle average radius.

13 Claims, 11 Drawing Sheets

(56) References Cited

FOREIGN PATENT DOCUMENTS

| JP | A-2006-235137 | 9/2006 |
| JP | A-2006-350111 | 12/2006 |
| JP | A-2008-116512 | 5/2008 |
| JP | A-2008-225100 | 9/2008 |
| JP | A-2009-186500 | 8/2009 |
| JP | A-2009-192740 | 8/2009 |
| JP | B2-4596356 | 12/2010 |
| JP | A-2011-118417 | 6/2011 |

* cited by examiner

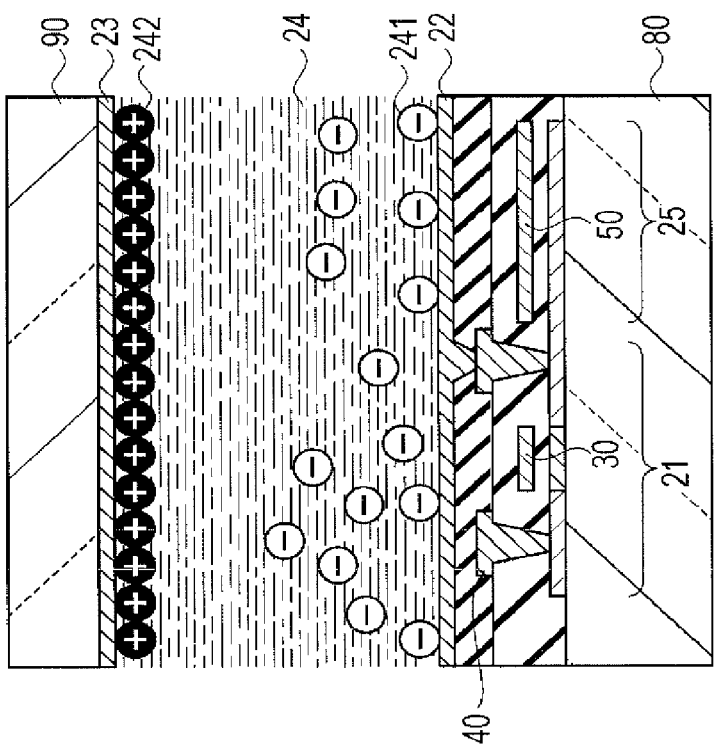
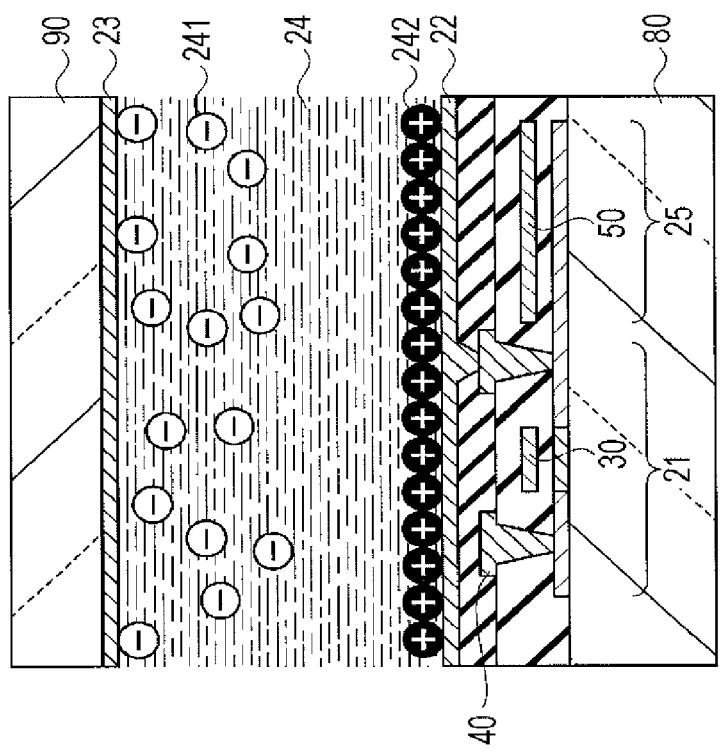

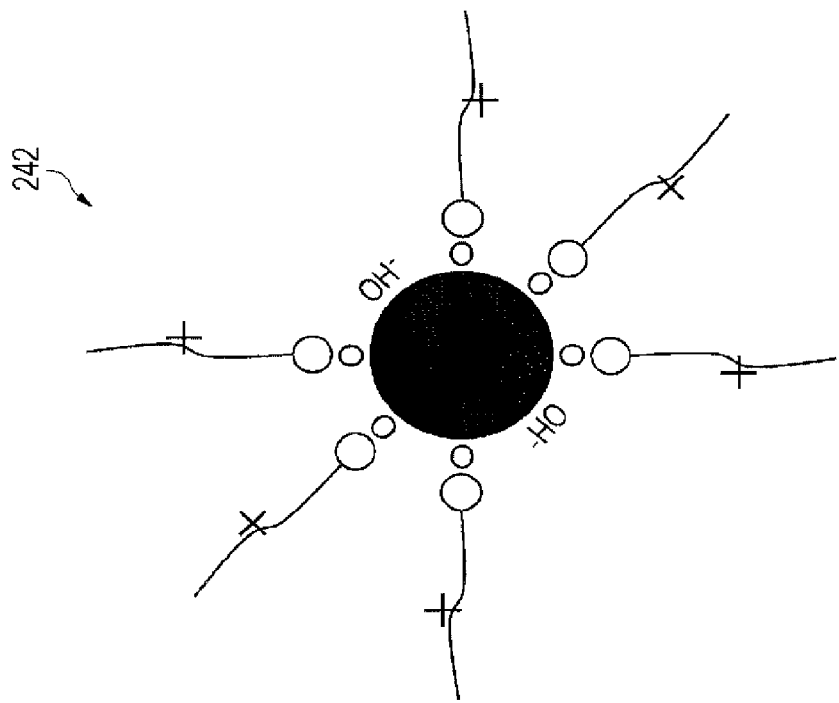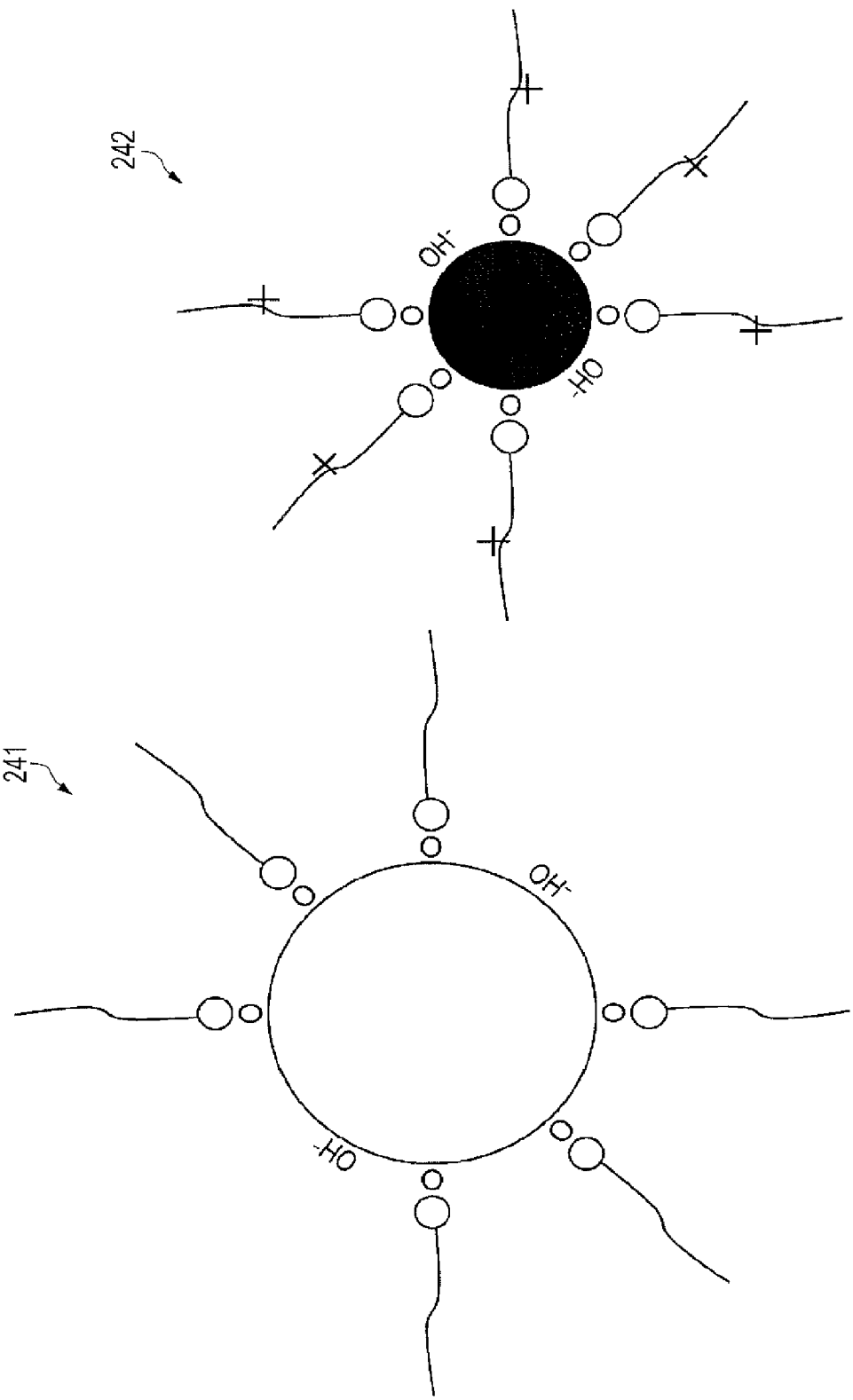

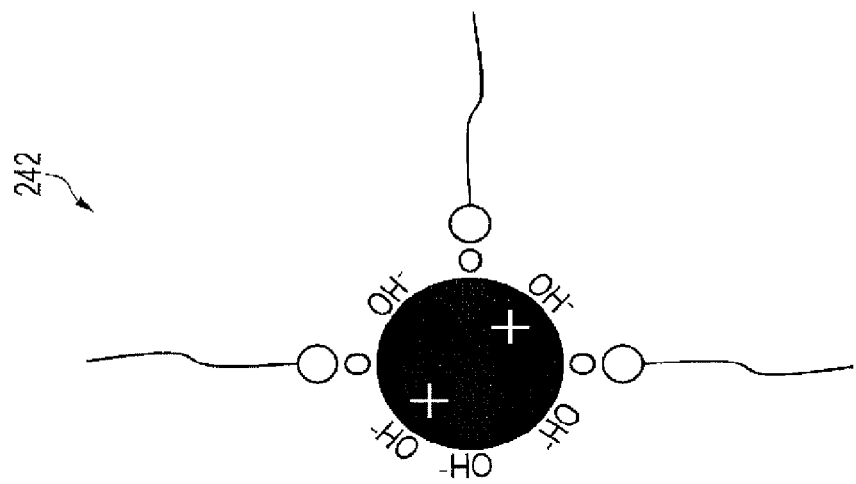
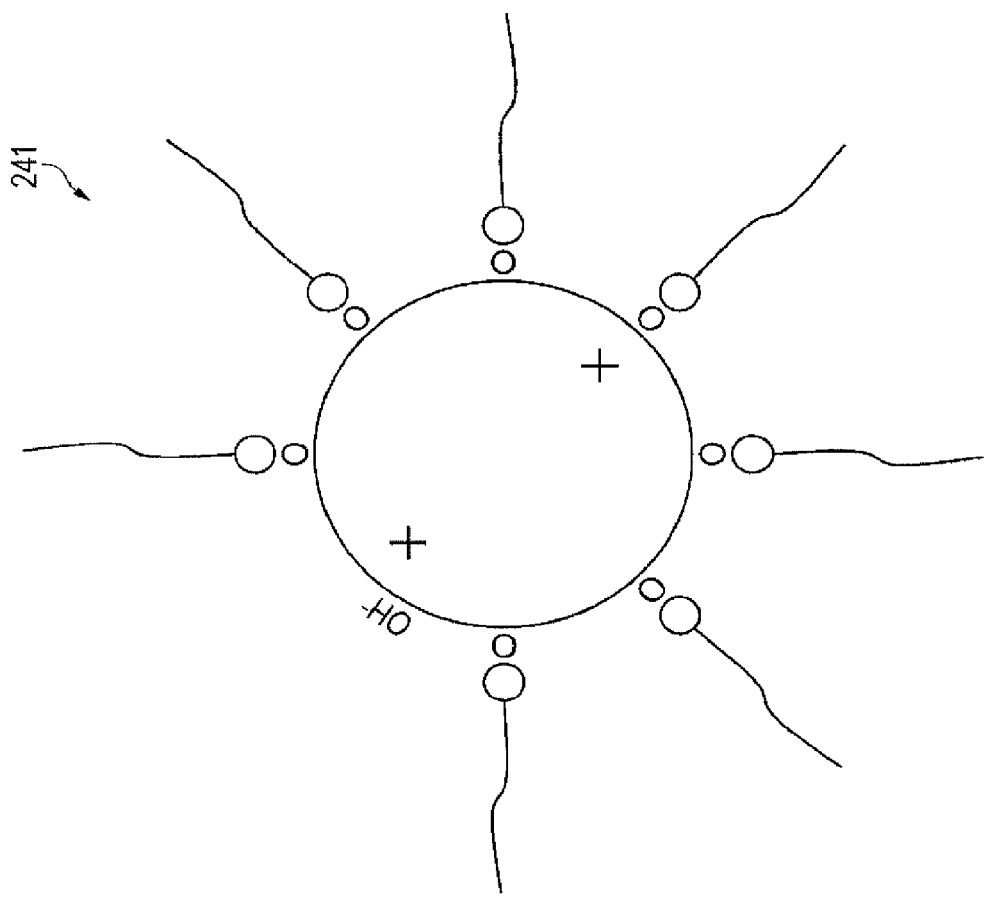

ELECTROPHORETIC MATERIAL, ELECTROPHORESIS DISPLAY DEVICE, AND ELECTRONIC APPARATUS

CROSS-REFERENCE TO RELATED APPLICATIONS

This is a Continuation Application of application Ser. No. 13/937,653, filed on Jul. 9, 2013, now U.S. Pat. No. 8,947,763, which claims priority to Japanese Application JP 2012-157224. The entire disclosures of the prior applications are hereby incorporated by reference herein in their entireties.

BACKGROUND

1. Technical Field

The present invention relates to technical fields of an electrophoretic material, an electrophoresis display device, and an electronic apparatus.

2. Related Art

In an electrophoresis display device, an image is formed on a display area by applying a voltage between a pixel electrode and a common electrode which are opposite to each other while interposing an electrophoretic material, and causing charged electrophoretic particles, such as white particles and black particles, to spatially migrate. If the electrophoretic particles once spatially migrate, diffusion is suppressed due to the cohesive force between the particles even when the voltage is removed. Therefore, the electrophoresis display device has a property of maintaining the image even when power is not supplied, and thus it is applied to a low-power consumption digital book, or the like. In an electrophoretic material in the related art, white particles, such as titanium oxide or the like, and red particles, such as dyed acrylic resin particles or the like, are used for electrophoretic particles as disclosed in JP-A-2011-118417. Specifically, a titanium oxide of 8 g which has an average particle diameter of 0.25 micrometer (μm) and an acrylic resin particle of 8 g which has an average particle diameter of 4 micrometer (μm) are dispersed in a dodecyl benzene of 80 mL, and are used as an electrophoretic material.

However, the electrophoretic material in the related art have problems in that a response speed with regard to an applied voltage is slow and that it is difficult to be driven at a low voltage. In other words, the electrophoretic material in the related art has a problem of bad electrophoretic properties (low voltage driving and high-speed response).

SUMMARY

The invention can be realized in the following forms or application examples.

Application Example 1

According to Application Example 1, there is provided an electrophoretic material, in which the particles are dispersed in a solvent, volume, which is obtained by dividing a volume of the solvent by a total number of particles, is called free volume, and a radius of a spherical space, which is occupied by sum of an average volume of the particles and the free volume, is called a free volume radius. The particles include at least first particles which are charged with a first polarity and second particles which are charged with a second polarity. An average radius of the first particles is called a first particle average radius, and an average radius of the second particles is called a second particle average radius. The first particle average radius is greater than the second particle average radius, a difference between the free volume radius and the first particle average radius is greater than the second particle average radius, and an electric charge amount of the second particles is greater than an electric charge amount of the first particles.

In the electrophoretic material, since the electric charge amount of second particles having a small particle size is great, the electrophoretic mobility of the second particles is greater than the electrophoretic mobility of the first particles, and thus it is easy to perform electrophoresis. On the other hand, since the second particle average radius is smaller than a distance which is obtained by subtracting the first particle average radius from the free volume radius, the second particles can easily pass through the gaps between the first particles. In short, the second particles having the large electrophoretic mobility can easily pass through the gaps between the first particles. Therefore, the response speed of the electrophoretic material is increased, and thus it is possible to drive the electrophoretic material at a low voltage. In other words, it is possible to provide the electrophoretic material having excellent electrophoretic properties.

Application Example 2

According to the configuration according to Application Example 1, it is preferable that surfaces of the second particles be coated with polymer molecules which include a functional group having the second polarity.

In the electrophoretic material, if the surfaces of the first particles are coated with polymer molecules which include a functional group having the non-polarity or the first polarity, it is possible to charge the first particles with the first polarity, and it is possible to charge the second particles with the second polarity. Further, since it is possible to independently control the electric charge amount of first particles and the electric charge amount of second particles, it is possible to cause the electric charge amount of second particles to be greater than the electric charge amount of first particles.

Application Example 3

In the electrophoretic material according to Application Example 1, it is preferable that surfaces of the first particles and the second particles be coated with non-polarity polymer molecules, and a coat ratio due to the non-polarity polymer molecules on the surfaces of the first particles be greater than a coat ratio due to the non-polarity polymer molecules on the surfaces of the second particles.

If the particles are dispersed in the solvent, an electric charge separation phenomenon, which moderates work function difference between the particles and the solvent, occurs, and thus the particles are charged. On the other hand, if the non-polarity polymer molecules are adsorbed to the surface of the particles, the surface electrification of the particles is neutralized. Therefore, in the electrophoretic material, it is possible to charge the first particles with the first polarity, to charge the second particles with the second polarity, and to cause the electric charge amount of second particles to be greater than the electric charge amount of first particles by varying a coating ratio due to the non-polarity polymer molecules in the first particles and the second particles.

Application Example 4

In the electrophoretic material according to Application Example 1, it is preferable that the first particles have white color, and the second particles have color which is different from the white color.

In the electrophoretic material, since the first particles, which are difficult to be electrophoresed, have white color, and are dispersed in the electrophoretic material in a relatively uniform and regular manner, the scattering of light is relatively uniform and regular, and thus it is possible to implement white display with high brightness.

Application Example 5

In the electrophoretic material according to Application Example 4, it is preferable that a volume concentration of the first particles be greater than a volume concentration of the second particles.

In the electrophoretic material, since the volume ratio of the first white particles is greater than the volume ratio of the second particles which have color and easily migrate, it is possible to implement the white display with high brightness.

Application Example 6

In the electrophoretic material according to Application Example 4, it is preferable that a ratio of a refractive index of the first particles to a refractive index of the solvent be greater than 1, and the first particle average radius be in a range which is equal to or greater than 0.05 μm and equal to or less than 0.4 μm.

In the electrophoretic material, it is possible to increase the scattering efficiency of visible light by the first particles. Therefore, it is possible to implement the white display with high brightness.

Application Example 7

In the electrophoretic material according to Application Example 6, it is preferable that the first particle average radius be in a range which is equal to or greater than 0.1 μm and equal to or less than 0.15 μm.

In the electrophoretic material, it is possible to particularly increase the scattering efficiency of visible light by the first particles. Therefore, it is possible to particularly implement the white display with higher brightness.

Application Example 8

In the electrophoretic material according to Application Example 4, it is preferable that the first particles be resin which includes an optical interface therein.

In the electrophoretic material, it is possible to scatter light on the surfaces of the first particles and an internal optical interface both. Therefore, it is possible to implement the white display with high brightness.

Application Example 9

In the electrophoretic material according to Application Example 8, it is preferable that the first particles include gaps therein.

In the electrophoretic material, it is possible to easily form the optical interfaces in the first particles. Further, since the density of the first particles is less than the density of the resin and is close to the density of the solvent, it is possible to disperse the first particles in the electrophoretic material in a relatively uniform and regular manner while improving dispersing stability. Therefore, it is possible to implement the white display with high brightness and it is possible to improve image retention characteristics.

Application Example 10

According to Application Example 10, there is provided an electrophoresis display device including the electrophoretic material.

In the electrophoretic material, it is possible to provide the electrophoresis display device in which a response speed is fast, in which clean display is performed, and in which image retention characteristics are excellent.

Application Example 11

According to Application Example 10, there is provided an electronic apparatus including the electrophoretic material.

In the electrophoretic material, it is possible to provide the electronic apparatus in which a response speed is fast, in which clean display is performed, and in which image retention characteristic is excellent.

BRIEF DESCRIPTION OF THE DRAWINGS

The invention will be described with reference to the accompanying drawings, wherein like numbers reference like elements.

FIGS. 2A and 2B are cross-sectional views illustrating an electrophoresis display device according to the first embodiment.

FIGS. 6A and 6B are views illustrating a particle charging process.

FIGS. 12A and 12B are views illustrating electrophoretic material according to a second modification example.

DESCRIPTION OF EXEMPLARY EMBODIMENTS

Hereinafter, embodiments of the invention will be described with reference to the accompanying drawings. Also, since each layer or each member has been resized to a recognizable degree in each of the drawings below, the scale of each layer or each member is different from an actual scale.

First Embodiment

Outline of Electronic Device

Figure 1:
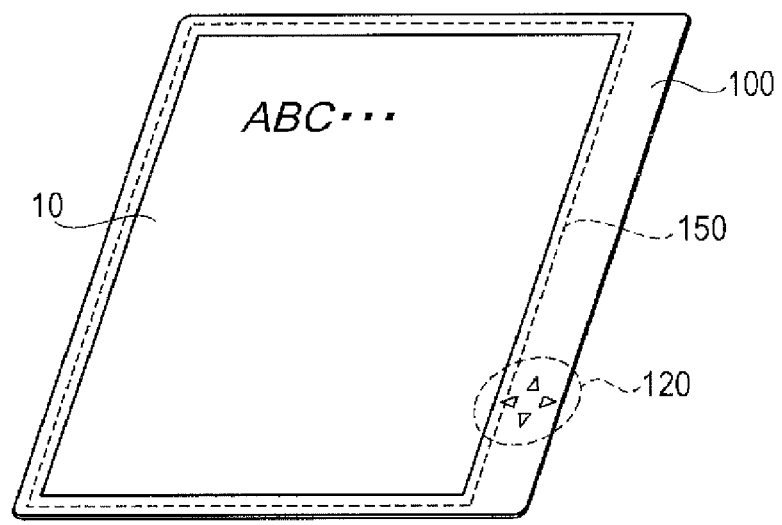
FIG. 1 is a perspective view illustrating an electronic apparatus according to a first embodiment.

FIG. 1 is a perspective view illustrating an electronic apparatus according to a first embodiment. First, the outline of the electronic apparatus and an electrophoresis display device according to the first embodiment will be described with reference to FIG. 1.

As shown in FIG. 1, an electronic apparatus 100 according to the invention includes an interface to operate an electrophoresis display device 150 and the electronic apparatus 100. Specifically, the interface is an operation unit 120 and includes switches. The electrophoresis display device 150 is a display module which includes a display area 10. The display area 10 includes a plurality of pixels 20 (refer to FIG. 7A), and an image is displayed in the display area 10 in such a way that the pixels 20 are electrically controlled.

Structure of Electrophoresis Display Device

FIGS. 2A and 2B are cross-sectional views illustrating the electrophoresis display device according to the first embodiment. FIG. 2A illustrates first display, and FIG. 2B illustrates second display. Also, it is assumed that the color of first particles 241 is first color and a case in which the first color is displayed is first display. In the same manner, it is assumed that the color of second particles 242 is second color and a case in which the second color is displayed is second display. The first color is different from the second color. In the first embodiment, as an example, it is assumed that the first color is a white color and the second color is a black color. Subsequently, the structure of the electrophoresis display device 150 according to the first embodiment will be described with reference to FIGS. 2A and 2B.

The electrophoresis display device 150 includes a first substrate 80 and a second substrate 90. A plurality of pixels 20 are arranged in the display area 10 in a matrix. In an area which becomes the display area 10 in the first substrate 80, a pixel electrode 22 and a pixel circuit (refer to FIG. 7B) are formed for each pixel 20. In the second substrate 90, a common electrode 23 is formed on the almost entire surface. The pixel circuit includes a pixel switching transistor 21 and a holding capacitor 25, and a single pixel 20 is formed at the intersection of a scan line 30 and a data line 40. Further, a common electric potential line 50 is wired in the pixel 20. An electrophoretic material 24 is interposed between the first substrate 80 and the second substrate 90. The particles of the electrophoretic material 24 are dispersed in a solvent. The particles include at least first particles 241 which are charged with first polarity and second particles 242 which are charged with second polarity, the particles are dispersed in the solvent, which is not shown in the drawing, together with an additive agent, such as a dispersing agent, which is not shown in the drawing, and configure the electrophoretic material 24.

The first polarity and the second polarity have electrically opposite polarities. In the first embodiment, as an example, it is assumed that the first polarity is negative (minus), and the second polarity is positive (plus). As a result, the electrophoretic material 24 shows electrophoretic property between the pixel electrode 22 and the common electrode 23. Since the first particles 241 and the second particles 242 are charged with polarities which are opposite to each other, it is possible to control the distribution positions of the first particles 241 and the second particles 242 in an electric field which is applied to the electrophoretic material 24. That is, it is possible to stabilize the qualities of images between different images.

It is preferable that the first color of the first particles 241 and the second color of the second particles 242 be complementary to each other. That is, it is preferable that a reflected color, obtained in such a way that the second particles 242 absorb the first color when white light is emitted to the second particles 242, be the second color. In the first embodiment, as an example, the first color is a white color, and the first particles 241 produce the white color. Therefore, the second color which is produced by the second particles 242 is a black color.

The second substrate 90 is transparent, and a user views the electrophoresis display device 150 from a side of the second substrate 90. Therefore, as shown in FIG. 2A, for example, in order to perform white display, the first white particles 241 are drawn on the side of the common electrode 23, and the second black particles 242 are drawn on the side of the pixel electrode 22. Light which is incident upon the electrophoresis display device 150 is scattered by the first particles 241, and thus the first display is performed. In contrast, in order to perform black display, as shown in FIG. 2B, the second black particles 242 are drawn on the side of the common electrode 23, and the first white particles 241 are drawn on the side of the pixel electrode 22. Light which is incident upon the electrophoresis display device 150 is scattered by the second particles 242, and light having the first color (in this case, white color) is absorbed, and thus the second display (in this case, black display) is performed.

In the first embodiment, although the second particles 242 are charged with the second polarity, a charging process to show the second polarity which is stronger than that of the first particles 241 is performed in the second particles 242. That is, the electric charge amount of second particles 242 is greater than the electric charge amount of first particles 241. In other words, the electrophoretic mobility of the second particles 242 is greater than the electrophoretic mobility of the first particles 241. As understood when FIG. 2A is compared with FIG. 2B, the second particles 242 are electrophoresed in such a way as to perceptively respond to the electric field in the first embodiment. Therefore, it is necessary that the second particles 242 are strongly charged, and the electrophoretic mobility should be great. On the other hand, the first particles 241 may be comparatively uniformly distributed between the first substrate 80 and the second substrate 90, and does not need to be strongly electrophoresed. In conclusion, in the first embodiment, display changes over in such a way that the second particles 242 are mainly electrophoresed in the electrophoresis display device 150 and the first particles 241 are weakly electrophoresed. Generally, if the charging process is performed on particles, ions having opposite polarity are released in the solvent, and thus the insulation property of the solvent is lowered. In the electrophoretic material 24 according to the first embodiment, since the charging process performed on the first particles 241 is weak, the amount of ions which are released in the solvent decreases, and thus the insulating property of the solvent increases. If the electric insulating property of the solvent increases, the electric field is effectively applied to the charged particles, and thus the electrophoretic property is improved. That is, since effective electric field intensity which is incurred by the charged particles increases, the electrophoretic property is improved. In this way, the electrophoresis display device 150 shows excellent electrophoretic property. In addition, the electrophoretic material 24 is configured such that the second particles 242 are smaller than the first particles 241, and the second particles 242 easily pass through the gaps between the particles of the first particles 241. If so, the electric charge amount becomes large, accordingly, the electrophoretic mobility is large, and the second small particles 242 can easily pass through the gaps between the first particles 241. As a result, the response speed of the electrophoretic material 24 is accelerated, and thus it is possible to drive the electrophoretic material 24 at a low voltage. In other words, it is possible to realize the electrophoresis display device 150 having excellent electrophoretic property.

Electrophoretic Material

Figure 3:
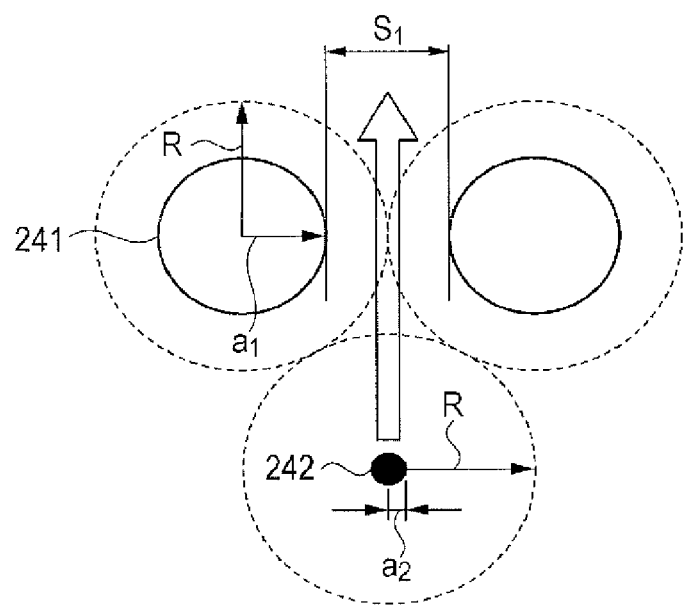
FIG. 3 is a pattern diagram illustrating the configuration of electrophoretic materials.
Figure 4B:
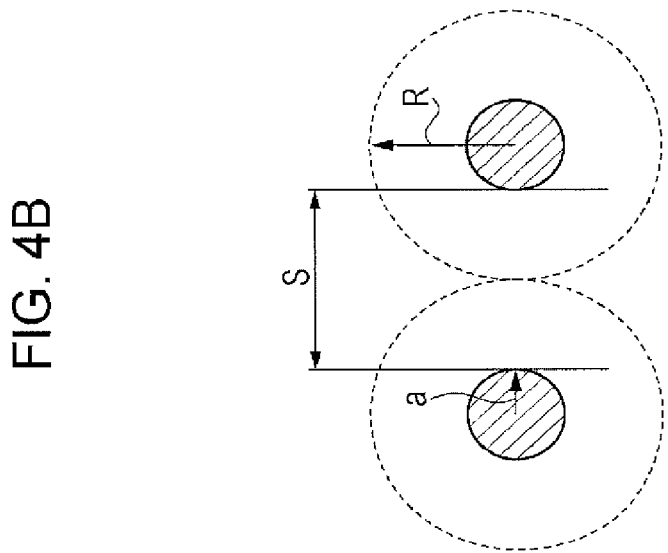
FIGS. 4A and 4B are views illustrating the relationship between the gap and concentration of the electrophoretic materials.
Figure 4A:
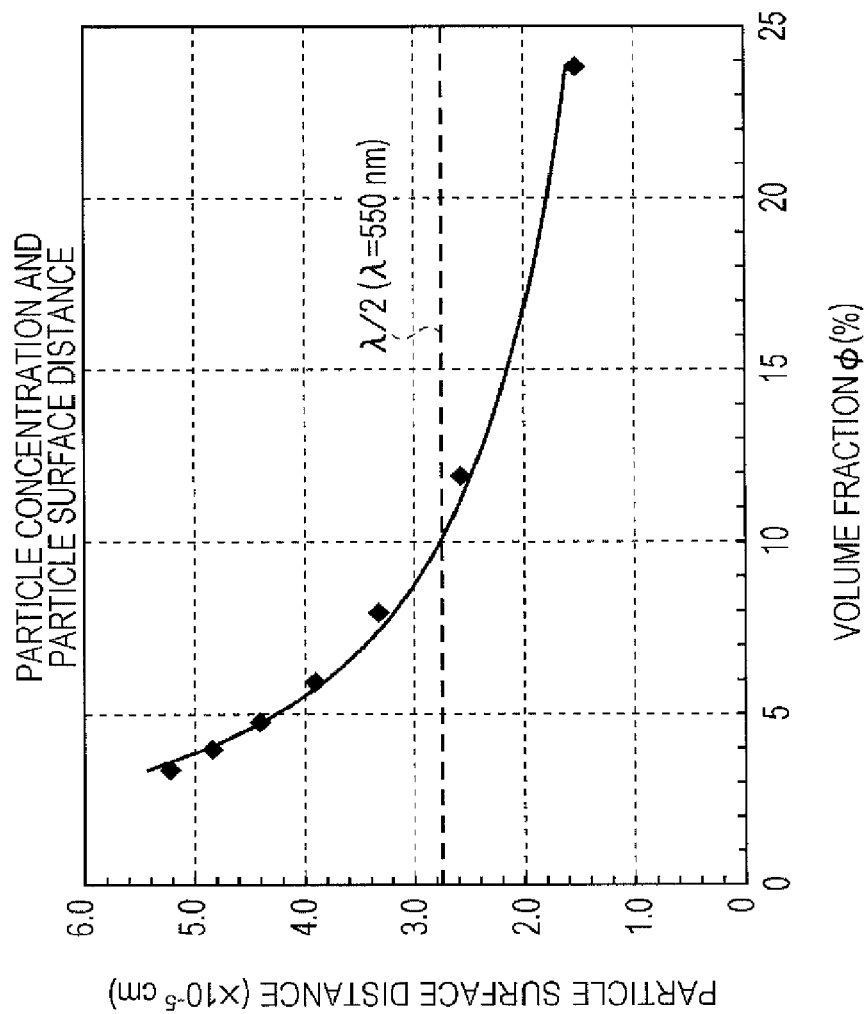
Figure 5:
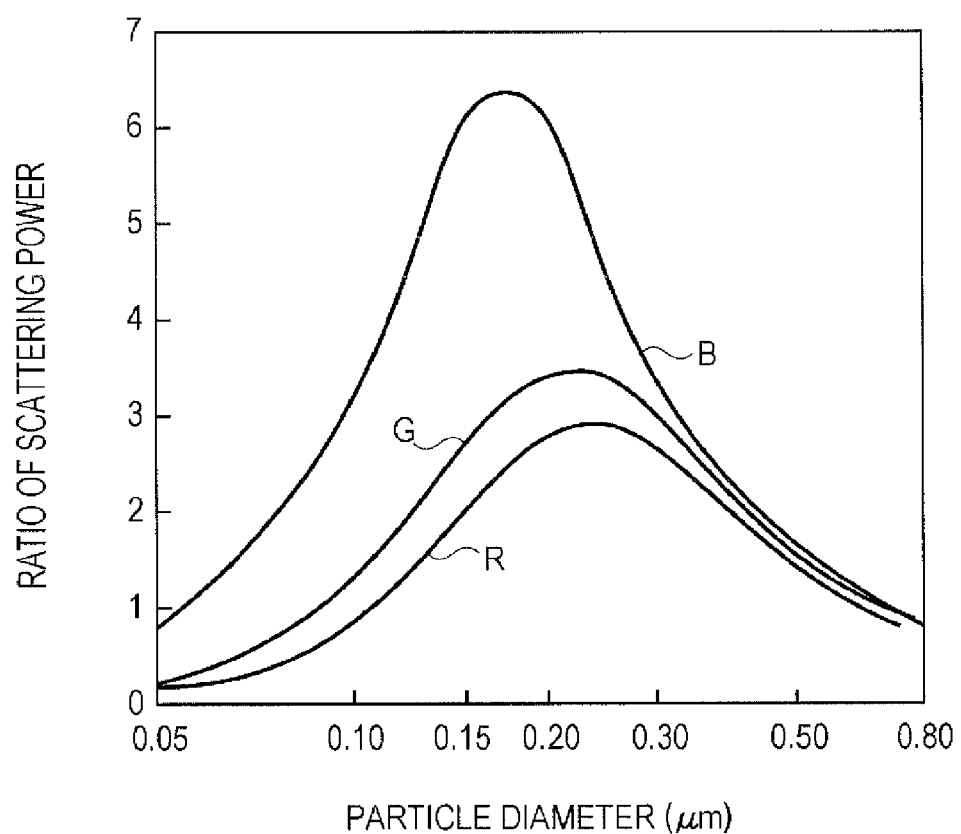
FIG. 5 is a view illustrating the relationship between a particle diameter and light scattering intensity.

FIG. 3 is a pattern diagram illustrating the configuration of the electrophoretic material. In addition, FIGS. 4A and 4B are views illustrating the relationship between the gap and concentration of the electrophoretic material. FIG. 5 is a view illustrating the relationship between a particle diameter and light scattering intensity. FIGS. 6A and 6B are views illustrating a particle charging process. Subsequently, the electrophoretic material 24 according to the first embodiment will be described with reference to FIGS. 3 to 6B. The material 24 mainly includes particles, such as the first particles 241 and the second particles 242, a solvent, and the other additive agents. Hereinafter, if it is not particularly necessary to distinguish the first particles 241 from the second particles 242, both are collectively and simply called particles.

According to the research which has been thoroughly studied by the applicant, the known reason for an electrophoretic material in the related art having inferior electrophoretic property is that the particle diameter or concentration of the electrophoretic particle, the electric charge amount, and the like are left out of consideration. Here, subsequently, the optimal configuration of the electrophoretic material 24 which includes the first particles 241, the second particles 242, and the like will be described. First, it is assumed that the electrophoretic material 24 includes k kinds of particles from the first particle 241 to the k-th particle. Here, k is an integer which is equal to or greater than 2. It is assumed that an i-th particle has a weight of $W_i$ and a density of $\rho_i$ in the electrophoretic material 24. Further, it is assumed that a material which combines the solvent and the additive agent has a weight of $W_0$, and a density of $\rho_0$ in the electrophoretic material 24. At this time, the volume $V_i$ of the i-th particle is expressed by Equation 1.

$$V_i = \frac{W_i}{\rho_i} \tag{1}$$

In addition, the volume (called the entire volume of the solvent) $V_0$ of the material which combines the solvent and the additive agent is expressed by Equation 2.

$$V_0 = \frac{W_0}{\rho_0} \tag{2}$$

The weight concentration $C_{Wi}$ of the i-th particle is a ratio of the weight of the i-th particle to the entire weight of the electrophoretic material 24, and is expressed by Equation 3.

$$C_{Wi} = \frac{W_i}{\sum_{i=0}^{k} W_i} \tag{3}$$

In the same manner, the volume concentration $C_{Vi}$ of the i-th particle is a ratio of the volume of the i-th particle to the entire volume of the electrophoretic material 24, and is expressed by Equation 4.

$$C_{Vi} = \frac{V_i}{\sum_{i=0}^{k} V_i} \tag{4}$$

If the average radius of the i-th particle is called an i-th particle average radius and expressed as $a_i$, the number concentration $C_{Ni}$ of the i-th particle is expressed by Equation 5. As an example, the average radius of the first particles 241 is a first particle average radius $a_1$, and the average radius of the second particles 242 is a second particle average radius $a_2$. Also, the number concentration $C_{Ni}$ is the number of i-th particles for unit volume of the electrophoretic material 24.

$$C_{Ni} = \frac{C_{Vi}}{\frac{4}{3}\pi a_i^3} = \frac{1}{\frac{4}{3}\pi a_i^3} \cdot \frac{V_i}{\sum_{i=0}^{k} V_i} \tag{5}$$

Equation 4 is taken into consideration in the second symbol in Equation 5. If the number average volume of the entire k kinds of particles is called particle average volume and is indicated by $V_p$, $V_p$ is as in Equation 6.

$$V_p = \frac{\sum_{i=1}^{k} \frac{4}{3}\pi a_i^2 C_{Ni}}{\sum_{i=1}^{k} C_{Ni}} = \frac{4}{3}\pi \cdot \frac{\sum_{i=1}^{k} a_i^3 C_{Ni}}{\sum_{i=1}^{k} C_{Ni}} \equiv \frac{4}{3}\pi a^3 \tag{6}$$

Also, the rightmost symbol in Equation 6 is a definitional equation which relates to a, and a is called an apparent particle radius. Therefore, the apparent particle radius a is as in Equation 7.

$$a = \left( \frac{\sum_{i=1}^{k} a_i^3 C_{Ni}}{\sum_{i=1}^{k} C_{Ni}} \right)^{\frac{1}{3}} \tag{7}$$

In addition, the number of i-th particles $N_i$ in the electrophoretic material 24 is as in Equation 8.

$$N_i = \frac{V_i}{\frac{4}{3}\pi a_i^3} \tag{8}$$

The volume, obtained by dividing the volume of the material which combines the solvent and the additive agent by the total number of particles in the electrophoretic material 24, is called free volume and expressed as $V_F$. The free volume $V_F$ is, in short, the volume of the material which combines the solvent and the additive agent for a single particle, and expressed as in Equation 9.

$$V_F = \frac{V_0}{\sum_{i=1}^{k} N_i} \quad (9)$$

Subsequently, the radius of a spherical space occupied by the sum of the average volume $V_p$ of the particles expressed in Equation 6 and the free volume $V_F$ expressed in Equation 9 is called a free volume radius and expressed as R. From this definition, the free volume radius R satisfies the relationship expressed in Equation 10.

$$\frac{4}{3}\pi R^3 \equiv V_p + V_F \quad (10)$$

A ratio of the total volume of the particles to the entire electrophoretic material 24 is called volume fraction φ. The volume fraction φ is obtained by summing up Equation 4 with regard to k particles. Further, when the volume fraction φ is taken into consideration with regard to a single particle, the volume fraction φ is a ratio of the average volume $V_p$ of the particles to the sum of the average volume $V_p$ and the free volume $V_F$ of the particle. Therefore, the volume fraction φ is as Equation 11.

$$\phi = \sum_{i=1}^{k} C_{Vi} = \frac{\sum_{i=1}^{k} V_i}{\sum_{i=0}^{k} V_i} = \frac{V_p}{V_p + V_F} = \frac{\frac{4}{3}\pi a^3}{\frac{4}{3}\pi R^3} = \left(\frac{a}{R}\right)^3 \quad (11)$$

In the electrophoretic material 24, the first particle average radius $a_1$ is greater than the second particle average radius $a_2$, and the difference between the free volume radius R and the first particle average radius $a_1$ is greater than the second particle average radius $a_2$. That is, with the regard to the radius of the particle, Equation 12 is satisfied.

$$a_1 > a_2 \; S_1 = 2R - 2a_1 > 2a_2 \quad (12)$$

FIG. 3 illustrates the relationship of a particle surface distance $S_1$ (refer to as a first particle surface distance S1) between the first particle 241 and another first particle 241, the free volume radius R, the first particle average radius $a_1$, and the second particle average radius $a_2$. The first particle surface distance $S_1$ is equal to the difference between double free volume radius R (free volume diameter) and double first particle average radius $a_1$ (first particle average diameter). On the other hand, the particle surface distance S1 is greater than the double second particle average radius $a_2$ (second particle average diameter).

In addition, the electric charge amount of second particles 242 is greater than the electric charge amount of first particles 241. As a result of such configuration, the second particles 242 can easily pass through the gaps between the first particles 241, and thus the electrophoretic property of the electrophoretic material 24 is improved.

Further, in the electrophoretic material 24, the volume concentration $C_{V1}$ of the first particles 241 is greater than the volume concentration $C_{V2}$ of the second particles 242. The mobility of the first particles 241 which have a large particle diameter and high volume concentration $C_{V1}$ is smaller than that of the second particles 242. As a result, the movement rate of the first particles 241 becomes low, and thus it is possible to reduce the resistance (power) which is received by the solvent due to the movement of the first particles 241, the unnecessary flow of solvent is suppressed, and thus the movement of the second particles 242 is not inhibited. In other words, the volume ratio of the first white particles 241 is greater than the volume ratio of the second particles 242 of color which easily move, and thus white display which has high brightness is implemented. Also, the electric charge amount $Q_1$ of the i-th particle in the electrophoretic material 24 is defined using Equation 13.

$$\mu_i = \frac{V}{E} = \frac{Q_i}{6\pi \eta a_i} \quad (13)$$

Where V is an average speed when an electric field E is applied to the i-th particle, η is the viscosity of the solvent, and $\mu_i$ is the electrophoretic mobility of the i-th particle. Otherwise, zeta potential $\zeta_i$ which is defined in Equation 14 is obtained and calculated.

$$\varsigma_i = \frac{Q_i}{4\pi a_i \varepsilon_0 \varepsilon_S} \quad (14)$$

Where $\in_0$ is the dielectric constant of vacuum, $\in_S$ is the relative dielectric constant of the solvent.

Whether or not Equation 12 is satisfied is examined as follows. The i-th particle average radius $a_i$ can be specified by measuring particle size distribution. The free volume radius R is acquired based on the volume fraction φ and the apparent particle radius a using Equation 11. The volume fraction φ is acquired by summing up the volume concentration $C_{Vi}$ expressed in Equation 4 with regard to the k kinds of particles using the first symbol in Equation 11. The apparent particle radius a is acquired by applying Equation 4 to Equation 7.

FIG. 4A is a view illustrating the relationship between the particle concentration and the particle surface distance (refer to as a particle surface distance S). The horizontal axis indicates the volume fraction φ, and the vertical axis is the particle surface distance S. The particle surface distance S is an average gap between particles, and is a value obtained by subtracting the double of the apparent particle radius a (the apparent particle diameter) from the free volume diameter 2R, as shown in FIG. 4B. When Equation 11 is taken into consideration, S is expressed as in Equation 15.

$$S = 2R - 2a = 2a\left\{\left(\frac{d}{\phi}\right)^{\frac{1}{3}} - 1\right\} \quad (15)$$

Where d is a filling ratio, a volume ratio obtained when a space is minutely filled with a sphere. The wavelength of visible light is approximately λ=550 nm. If the particle surface distance S is less than λ/2 (275 nm), scattering efficiency due to the particles is reduced. If the particle surface distance S is greater than the λ/2 (275 nm), scattering efficiency due to the particles is improved. Therefore, it is preferable that the volume fraction φ be equal to or less than 10% according to FIG. 4A. Since the scattering efficiency is maximized when the particle surface distance S is approximately λ/2 (275 nm), it is preferable that the volume fraction φ be a value which is equal to or less than 10% and is close to 10%.

In the electrophoretic material 24, the first particles 241 have white color, and the second particles 242 have color which is different from the white color. That is, the first particles 241, which are difficult to be electrophoresed because the particle diameters are relatively large and the electric charge amount is small, have white color, and are dispersed in the electrophoretic material 24 in a relatively uniform and regular manner. As a result, the scattering of light is relatively uniform and regular, and thus it is possible to implement the white display in which the brightness is high. Above all, the volume fraction is equal to or less than 10%, and, in a case of the value of the volume fraction to be 10% after rounding off, white display which has extremely high brightness is performed.

FIG. 5 is a view illustrating the relationship between a ratio of scattering power and the particle diameter of red light R, green light G, and blue light B. Subsequently, the particle diameter will be described with reference to FIG. 5. In the electrophoretic material 24, a ratio of the refractive index of the first particles 241 to the refractive index of the solvent is greater than 1. The particles include pigment itself and particles (resin-based color particles) which are obtained by mixing a color material, called pigment or dye, with resin-based particles. When viewed from dispersing stability, it is preferable that the particles be small. More specifically, the first particle average radius is in a range which is equal to or greater than 0.05 μm and equal to or less than 0.4 μm. It is further preferable that the first particle average radius be in a range which is equal to or greater than 0.1 μm and equal to or less than 0.3 μm. That is, it is preferable that the average particle diameter of the first particles 241 be in a range which is equal to or greater than 0.1 μm and equal to or less than 0.8 μm. It is further preferable that the average particle diameter of the first particles 241 be in a range which is equal to or greater than 0.2 μm and equal to or less than 0.6 μm. As shown in FIG. 5, in such ranges, the ratio of scattering power of the visible light has the maximum value. Therefore, if the first particles 241 which perform the white display satisfy the above conditions, the scattering efficiency becomes high, and the white brightness is improved.

When pigment is used as the particle, the pigment may be used as it is, or the surface of the pigment may be coated by a material, such as a resin material or another pigment, and may then be used. As described above, it is preferable that the first particles 241 be a resin which includes an optical interface inside thereof. The particles, which coat the surface of the pigment using another material, include, for example, particles which coat the surfaces of titanium oxide particles with silicon oxide or aluminum oxide. The particles are suitable as the white particles. The refractive index of the silicon oxide or the aluminum oxide is close to the refractive index of the solvent, and light is hardly scattered on an interior titanium oxide surface. The silicon oxide or the aluminum oxide can suppress the photocatalytic activity of the titanium oxide, and can acquire white particles which have excellent weatherability. As another method of providing the optical interfaces inside the first particles 241, the first particles 241 may include gaps inside thereof. The interface between fluid (gas or liquid), which fills up the gap, and the resin becomes the optical interface. Further, since the density of the fluid is mainly smaller than the density of the resin, the density of the first particles 241 is smaller than the density of the resin and is close to the density of the solvent. As a result, the dispersing stability is improved, and the first particles 241 are dispersed in the electrophoretic material in a relatively uniform and regular manner. Accordingly, the electrophoresis display device 150 can implement the white display which has high brightness, and can improve the image retention characteristics.

When resin-based color particles are used as the particles, as a basal material of resin-based particles, acrylic resin or urethane-based resin, urea-based resin, epoxy-based resin, polystyrene, polyester, polyethylene, polypropylene, and the like are exemplified. The resin-based particles are obtained by combining one or two of them. The resin-based color particles which are obtained by mixing a color material with the resin-based particles include resin-based particles which are obtained by coating the surfaces of the resin-based particles with pigment or dye in addition to resin-based particles which are obtained by mixing pigment or dye with the above-described basal material in an appropriate composition ratio. The surfaces of the resin-based color particles obtained as described above may be further modified using an organic material such as macromolecular polymer, and may be modified using an inorganic material such as silicon oxide.

Since the pigment which presents a first color is used as the first particles 241 and the first color is white in the first embodiment, titanium oxide (density 4 g/cm$^3$ is s used for the first particles 241 as a case in point. The average particle diameter of the titanium oxide is 250 nm. In addition to titanium oxide, antimonous oxide (density 5.2 g/cm$^3$), aluminum oxide (density 4.0 g/cm$^3$), calcium carbonate (density 2.8 g/cm$^3$), barium oxide (density 5.7 g/cm$^3$), barium carbonate (density 4.3 g/cm$^3$), barium sulfate (density 4.5 g/cm$^3$), magnesium oxide (density 3.65 g/cm$^3$), and the like may be used for the first particles 241.

Since the pigment which presents a second color is used as the second particles 242 and the second color is black in the first embodiment, titanium black (density 4 g/cm$^3$) is used for the second particles 242 as a case in point. The average particle diameter of the titanium black is 100 nm. In addition to titanium black, aniline black, carbon black, and the like may be used for the second particles 242.

It is preferable that a high insulating solvent be used for the solvent. As an example, water, an alcohol-based solvent, such as methanol, ethanol, butanol, isopropanol, octanol, methylcellosolve, or the like, an aromatic-based hydrocarbon system solvent, such as o-xylene or m-xylene, p-xylene, toluene, benzene, dodecylbenzene, hexyl benzene, Phenyl xylyl ethane, or the like, an alicyclic hydrocarbon system solvent, such as cyclohexane or naphthene-based hydrocarbon, or the like, an aliphatic hydrocarbon-based solvent, such as n-hexane, kerosene, paraffin-based hydrocarbon, or the like, various types of ester-based solvents, such as acetic ether, butyl acetate, and the like, a ketone-based solvent, such as acetone and methyl ethyl ketone, methyl isobutyl ketone, or the like, silicone oil, such as polydimethylsiloxane or the like, plant oil, such as soy oil, sunflower oil, olive oil, or the like, a halogenated hydrocarbon-based solvent, such as chlorobutane, chloroform, dichlorobenzene, trichlorethylene, trichlorfluoroethylene, trichloroethane, carbon tetrachloride, cyclohexylchloride, chlorobenzene, 1,1,2,2-tetrachloroethylene, fluoroethane trichloride, ethyldibromide tetrafluoride, ethane bromide, methylene iodide, tri-iodo silane, methyl iodide, or the like, carbon bisulfide, a petroleum-based solvent, such as an isoparaffin-based solvent, and the like exemplify water and almost organic solvents. When high electrophoretic property is shown, high insulating property is obtained for a solvent. The optimal solvent includes the silicone oil, the petroleum-based solvent, and the ester-based solvent. In the ester-based solvent, ester which is described in a general expression $C_nH_{2n+1}COOC_mH_{2m+1}$ is the most preferable. In the first embodiment, ester of $C_6H_{13}COOCH_3$ is used. The electrophoretic material 24 is manufactured by placing white particles of 30 wt % and black particles of 5 wt % into the ester-based solvent, applying ultrasonic waves for one hour, and dispersing them.

FIGS. 6A and 6B are views illustrating a particle charging process. FIG. 6A shows the first particle, and FIG. 6B shows the second particle. Subsequently, a particle charging process method will be described with reference to FIGS. 6A and 6B. In the electrophoretic material 24, the surface of the first particle 241 is coated with polymer molecules which include a functional group having a non-polarity or a first polarity, and the surface of the second particle 242 is coated with polymer molecules which include a functional group having a second polarity. When this is done, it is possible to charge the first particle 241 with the first polarity, and it is possible to charge the second particle 242 with the second polarity. Further, since it is possible to independently control the electric charge amount of first particle 241 and the electric charge amount of second particles 242, it is possible to cause the electric charge amount of second particles 242 to be greater than the electric charge amount of first particle 241.

The first particles 241 and the second particles 242 both include metallic oxide, such as silica, alumina, zirconia, or the like, on the surfaces thereof as necessary. Mainly, the surfaces of the particles are charged by the disassociation of surface hydroxyl group (—OH⁻ is present on the surfaces). A silane coupling agent or the like is used as a surface preparation agent. The silane coupling agent is an organic silicide which combines functional polymer molecules and a hydrolyzable group (—OR). —OCH₃, —OC₂H₅, —OCOCH₃, and the like are used as the hydrolyzable group (—OR). After being temporarily hydrolyzed for silanolating the silane coupling agent, the hydrolyzable group (—OR) directly dehydration-reacts to the hydroxyl group on the particle surface, and is coupled to the particle surface.

As shown in FIG. 6A, the functional polymer molecules of the surface preparation agent which coats the first particle 241 are non-polarity polymer molecules. As an example, the non-polarity polymer molecules are carbon hydride or silicone. The surface hydroxyl group which has been originally present on the surface of the first particle 241 is coupled to the surface preparation agent through covalent coupling as described above, and thus the surface of the first particle 241 is coated with the non-polarity polymer molecules. As a result, the amount of surface hydroxyl group which is negatively charged is reduced in such a way that the surface hydroxyl group is coupled to the surface preparation agent. That is, it is possible to control the negative electric charge amount depending on a surface preparation agent coating amount.

As shown in FIG. 6B, the functional polymer molecules of the surface preparation agent which coat the second particle 242 are polymer molecules which include a functional group having the second polarity. As an example, the polymer molecules which include the functional group having the second polarity are polymer molecules which include a quaternized-ammonium group or an amino group. The surface hydroxyl group which has been originally present on the surface of the second particle 242 is coupled to the surface preparation agent through covalent coupling as described above and is reduced. The surface of the second particle 242 is coated with the polymer molecules which include the functional group having the second polarity. The functional group which has the second polarity is disassociated and is positively charged. Therefore, the electric charge amount of second particles 242 is controlled by increasing the amount of second polarity group in the polymer molecules. Like this, it is possible to control the positive electric charge amount depending on a surface preparation agent coating amount. The polymer molecules which include the polarity group may be copolymer or block polymer.

Also, the surface preparation agent may cause the silane coupling agent which includes the functional polymer molecules to be adsorbed to the surfaces of the particles, and then may cause the silane coupling agent to react thereon, or may cause a treatment agent which includes the silane coupling agent and a polymerization start group to be adsorbed and to react, and then the functional polymer molecules may be attached to the silane coupling agent using a known polymerization method.

Example

An example according to the first embodiment will be described below. In the electrophoretic material 24, the solvent is isoparaffin, the density $\rho_0$ is 0.8 g/cm³, the weight concentration $C_{W0}$ is 65 wt %, and the volume concentration $C_{V0}$ is 90.3%. In the electrophoretic material 24, the first particles 241 are titanium oxide (TiO₂), the density $\rho_1$ is 4 g/cm³, the weight concentration $C_{W1}$ is 30 wt %, and the first particle average radius $a_1$=125 nm. Therefore, the volume concentration $C_{V1}$ of the first particles 241 are 8.3%. In the electrophoretic material 24, the second particles 242 are titanium black, the density $\rho_2$ is 4 g/cm³, the weight concentration $C_{W2}$ is 5 wt %, the second particle average radius $a_2$ is 50 nm. Therefore, the volume concentration $C_{V2}$ of the second particles 242 is 1.4%. As a result, according to Equation 11, the volume fraction $\phi$=9.7%. On the other hand, according to Equation 5, the number concentration $C_{N1}$ of the first particles 241 is $1.02\times10^{13}$ number/cm³, and the number concentration $C_{N2}$ of the second particles 242 is $2.65\times10^{13}$ number/cm³. When the values of the number concentration are substituted into Equation 7, the apparent particle radius a is 85.8 nm. When the values of the volume fraction $\phi$ and the apparent particle radius a are lastly substituted into Equation 11, the free volume radius R=187 nm is acquired. $2R-2a_1$=124 nm. This value is greater than $2a_2$=100 nm, and satisfies Equation 12. That is, the second particles 242 can easily pass through the gap between the first particles 241. For reference, $2R-2a_2$=274 nm. This value is greater than $2a_1$=250 nm, and thus first particles 241 can easily pass through the gap between the second particles 242. As described above, in the electrophoretic material 24 according to the first embodiment, the first particles 241 and the second particles 242 are mutually configured to easily pass through the gaps between other parties, and thus an electrophoretic response with regard to the electric field is fast.

Comparison Example

As a comparison example, a relationship of the composition disclosed in JP-A-2011-118417 is found out. In JP-A-2011-118417, the solvent is dodecyl benzene, the density $\rho_0$ is 0.856 g/cm$^3$, the volume $V_0$ of the solvent is 80 mL, and the weight $W_0$ is 68.48 g. The acrylic resin which corresponds to the first particles has a density $\rho_1$ of 1.2 g/cm$^3$, a weight concentration $C_{W1}$ of 9.5 wt %, and an acrylic resin average radius $a_1$ of 2000 nm. Therefore, the volume concentration $C_{V1}$ of the acrylic resin is 7.5%. The titanium oxide which corresponds to the second particles has a density $\rho_2$ of 4 g/cm$^3$, a weight concentration $C_{W2}$ of 9.5 wt %, and a titanium oxide average radius $a_2$ of 125 nm. Therefore, the volume concentration $C_{V2}$ of the titanium oxide is 2.3%. As a result, according to Equation 11, the volume fraction $\phi$ is 9.8%. On the other hand, according to Equation 5, the number concentration $C_{N1}$ of the acrylic resin is 2.24×10$^9$ number/cm$^3$, and the number concentration $C_{N2}$ of the titanium oxide is 2.76×10$^{12}$ number/cm$^3$. When the values of the number concentration are substituted into Equation 7, the apparent particle radius a is 204 nm. When the values of the volume fraction $\phi$ and the apparent particle radius a are lastly substituted into Equation 11, a free volume radius R of 442 nm is acquired. 2R−2$a_1$=−3120 nm. This value is smaller than 2$a_2$=250 nm, and does not satisfy Equation 12. That is, it is difficult that the titanium oxide passes through the gaps between acrylic resins. On the other hand, 2R−2$a_2$=634 nm. This value is smaller than 2$a_1$=4000 nm, and does not satisfy Equation 12. That is, it is difficult that the acrylic resin passes through the gaps between the titanium oxides. As described above, in the comparison example, two kinds of particles are mutually configured such that it is difficult for them to pass through the gaps between other parties, and thus it is considered that an electrophoretic response with regard to the electric field is slow.

Circuit Configuration

Figure 7B:
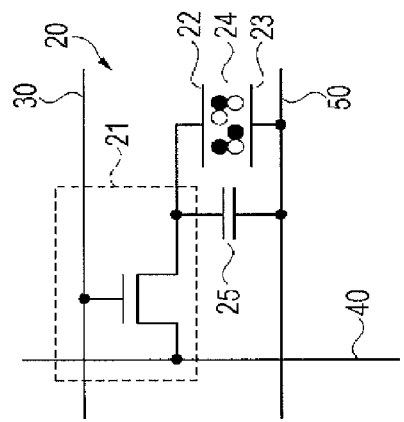
FIGS. 7A and 7B are circuit diagrams illustrating the electrophoresis display device according to the first embodiment.
Figure 7A:
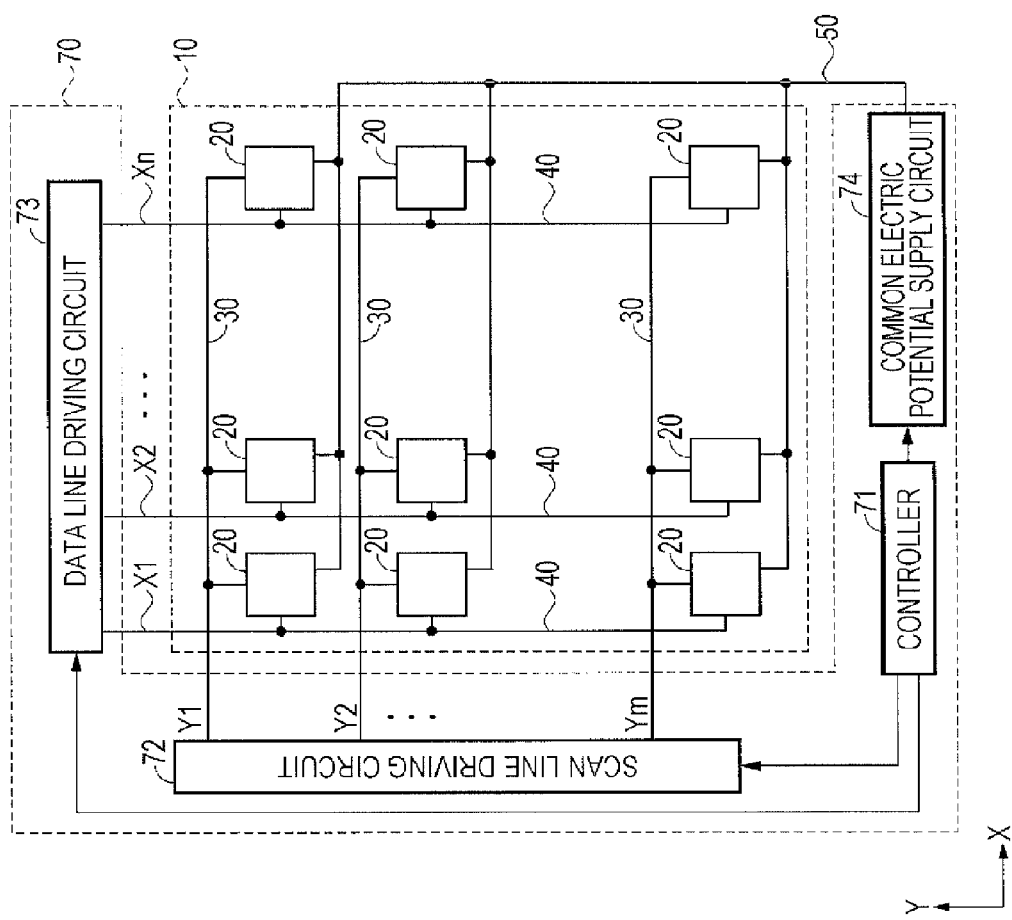

FIGS. 7A and 7B are circuit diagrams illustrating the electrophoresis display device according to the first embodiment. FIG. 7A is a view illustrating a whole configuration, and FIG. 7B is a view illustrating a pixel circuit. Subsequently, the driving circuit of the electrophoresis display device according to the first embodiment will be described with reference to FIGS. 7A and 7B.

As shown in FIG. 7A, in the display area 10, the pixels 20 corresponding to m row×n column are arranged in a matrix (two-dimensional plane). In addition, in the display area 10, m scan lines 30 (that is, scan lines Y1, Y2, . . . , Ym) and n data lines 40 (that is, data lines X1, X2, . . . , Xn) are provided to intersect each other. Specifically, the m scan lines 30 are extended in the row direction (that is, X direction), and the n data lines 40 are extended in the column direction (that is, Y direction). The pixels 20 are arranged to correspond to the intersections between the m scan lines 30 and the n data lines 40.

The driving circuit 70 is provided on the outside of the display area 10. The driving circuit 70 includes the controller 71, the scan line driving circuit 72, the data line driving circuit 73, and the common electric potential supply circuit 74. The controller 71 controls the operations of the scan line driving circuit 72, the data line driving circuit 73, and the common electric potential supply circuit 74, and supplies various signals, such as a clock signal and a timing signal, to each circuit.

The scan line driving circuit 72 sequentially supplies a scan signal to each of the scan lines Y1, Y2, . . . , Ym in a pulse-like manner based on the timing signal supplied from the controller 71. The data line driving circuit 73 supplies an image signal to each of the data lines X1, X2, . . . , Xn based on the timing signal supplied from the controller 71. The image signal takes multi-valued potential from among high potential VH (for example, 15 V), middle potential VM (for example, 0V), and low potential VL (for example, −15 V). Also, in the first embodiment, the image signal has three values, an image signal having high potential VH is supplied to a pixel electrode 22 which is transferred to the second display (black display), and an image signal having low potential VL is supplied to the pixel electrode 22 which is transferred to the first display (white display).

The common electric potential supply circuit 74 supplies common potential Vcom to the common electric potential line 50. Also, the common potential Vcom may be a constant potential, and may vary depending on, for example, a grayscale or a frame to be written. In addition, individual control may be performed for each row. In the first embodiment, the common potential Vcom functions as a reference potential with regard to the total potential. Also, although various signals are input to and output from the controller 71, the scan line driving circuit 72, the data line driving circuit 73, and the common electric potential supply circuit 74, signals which are not particularly related to the first embodiment will not be described.

As shown in the circuit diagram of FIG. 7B, the pixel 20 includes a pixel switching transistor 21, a pixel electrode 22, a common electrode 23, an electrophoretic material 24, and a holding capacitor 25.

The pixel switching transistor 21 is configured from, for example, an N-type transistor. Here, although an upper gate-type thin film transistor is used as shown in FIG. 2, a lower gate-type thin film transistor may be used. The pixel switching transistor 21 has a gate which is electrically connected to the scan line 30, a source which is electrically connected to the data line 40, and a drain which is electrically connected to each one end of the pixel electrode 22 and the holding capacitor 25. The holding capacitor 25 includes a pair of electrodes which are arranged to face each other via a dielectric film. One electrode (one end) is electrically connected to the pixel electrode 22 and the pixel switching transistor 21, and the other electrode (the other end) is electrically connected to the common electric potential line 50. The holding capacitor 25 enables an image signal to be maintained for a predetermined period. The pixel switching transistor 21 outputs the image signal, which is supplied from the data line driving circuit 73 via the data line 40, to the pixel electrode 22 and the holding capacitor 25 at a timing based on the scan signal which is supplied from the scan line driving circuit 72 via the scan line 30 in a pulse-like manner.

The image signal is supplied to the pixel electrode 22 from the data line driving circuit 73 via the data line 40 and the pixel switching transistor 21. The pixel electrode 22 is arranged to mutually face the common electrode 23 via the electrophoretic material 24. The common electrode 23 is electrically connected to the common electric potential line 50 which provides the common potential $V_{com}$. The common electrode 23 is provided on the second substrate 90 which faces the first substrate 80 on which the pixel electrode 22 is formed. The first particles 241 and the second particles 242 are electrophoresed in the vertical direction in the cross-sectional views shown in FIGS. 2A and 2B. Also, the common electrode 23 may be provided on the first substrate 80 on which the pixel electrode 22 is formed, and the electrophoretic particles may be electrophoresed in the lateral direction (in the horizontal direction in FIGS. 2A and 2B) of the cross-sectional views in FIGS. 2A and 2B.

Electronic Device

Subsequently, an electronic apparatus to which the above-described electrophoresis display device is applied will be described with reference to FIGS. 8 and 9. Hereinafter, a case in which the above-described electrophoresis display device 150 is applied to electronic paper 400 and an electronic note 500 is exemplified.

Figure 8:
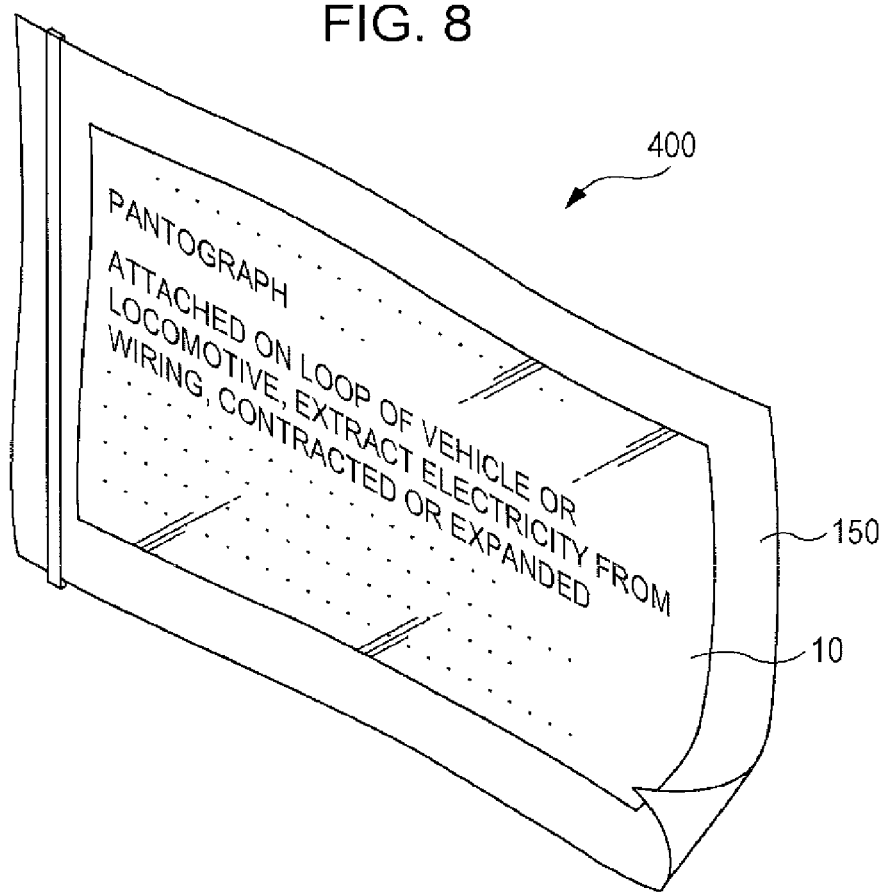
FIG. 8 is a perspective view illustrating the configuration of electronic paper.

FIG. 8 is a perspective view illustrating the configuration of the electronic paper. As shown in FIG. 8, the electronic paper 400 includes the electrophoresis display device 150 according to the first embodiment. The electronic paper 400 includes a rewritable sheet which is flexible and has the same texture and flexibility as paper in the related art.

Figure 9:
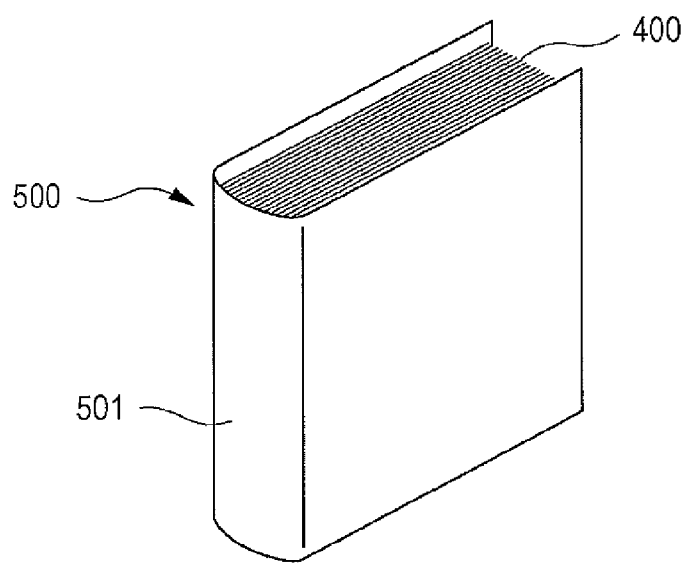
FIG. 9 is a perspective view illustrating the configuration of an electronic note.

FIG. 9 is a perspective view illustrating the configuration of the electronic note. As shown in FIG. 9, the electronic note 500 is obtained by bundling a plurality of pieces of electronic paper 400 shown in FIG. 8 and sandwiching the electronic paper 400 in a cover 501. The cover 501 includes, for example, a display data input unit to input display data which is transmitted from an external device. Therefore, it is possible to modify or update display content based on the display data in a state in which the electronic paper 400 is bundled.

Since the above-described electronic paper 400 and the electronic note 500 include the electrophoresis display device 150 according to the first embodiment, it is possible to perform high-quality image display. Also, it is possible to apply the electrophoresis display device 150 according to the first embodiment to an electronic apparatus, such as a wristwatch, a mobile phone, a portable audio device, an electronic tablet terminal, a personal computer, a digital signage, an electronic blackboard, or the like, in addition to the electronic paper 400 and the electronic note 500.

As described above, according to the electrophoretic material 24 according to the first embodiment, the electrophoresis display device 150 to which the electrophoretic material 24 is applied, and the electronic apparatus to which the electrophoresis display device 150 is applied, the following advantages can be acquired.

Since the electric charge amount of the second particles 242 each having a small particle diameter is greater than the electric charge amount of the first particles 241 each having a large particle diameter, the electrophoretic mobility of the second particles 242 is greater than the electrophoretic mobility of the first particles 241, and thus it is easy to perform electrophoresis. On the other hand, since the second particle average radius $a_2$ is smaller than a distance obtained by subtracting the first particle average radius $a_1$ from the free volume radius R, the second particles 242 can easily pass through the gaps between the first particles 241. In short, the second particles 242 having large electrophoretic mobility can easily pass through the gaps between the first particles 241. Therefore, it is possible to drive the electrophoretic material 24 at a low voltage by increasing the response speed of the electrophoretic material 24. In other words, it is possible to provide the electrophoretic material 24 having excellent electrophoretic property. Accordingly, it is possible to provide the electrophoresis display device 150 and the electronic apparatus in which a response speed is fast, in which clean display is performed, and in which the image retention characteristics are excellent.

Second Embodiment

Forms of Three Particle Groups

Figure 10A:
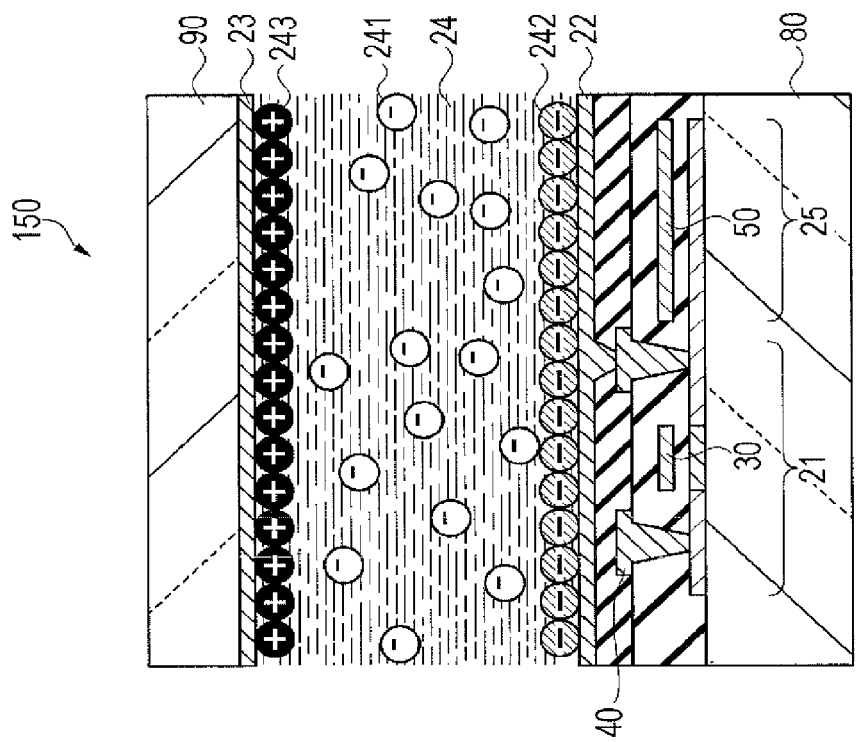
FIGS. 10A and 10B are cross-sectional views illustrating an electrophoresis display device according to a second embodiment.
Figure 10B:
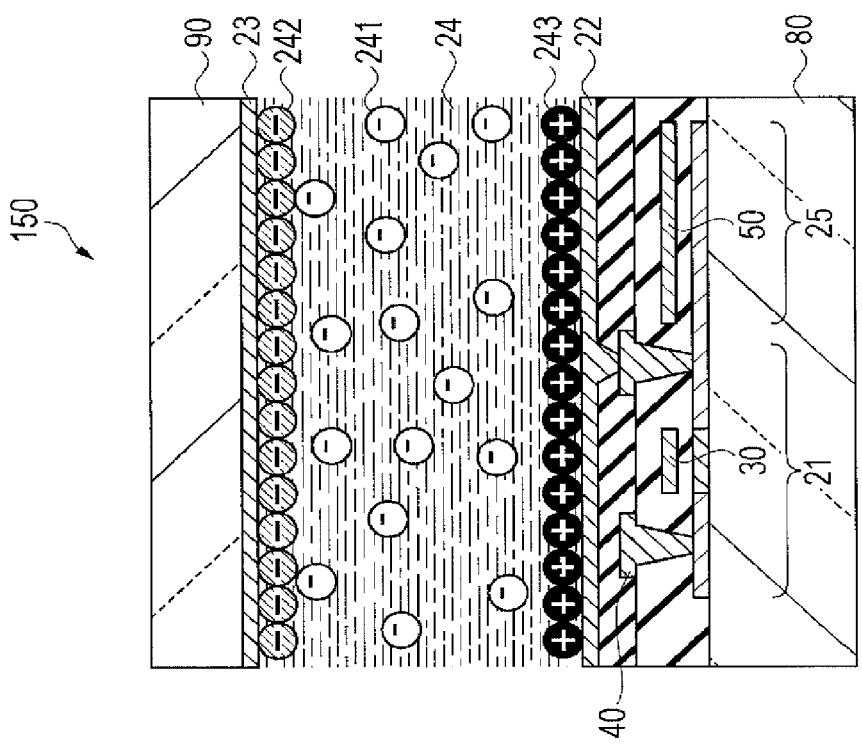

FIGS. 10A and 10B are cross-sectional views illustrating an electrophoresis display device according to a second embodiment. FIG. 10A illustrates second display, and FIG. 10B illustrates third display. Hereinafter, an electrophoretic material 24 and an electrophoresis display device 150 according to the second embodiment will be described. Also, the same reference numerals are used for the same components as in the first embodiment, and the description will not be repeated.

The second embodiment (FIGS. 10A and 10B) is different from the first embodiment (FIGS. 2A and 2B) in that there are three particle groups. The other configurations are almost the same as in the first embodiment. In the first embodiment (FIGS. 2A and 2B), there are two kinds of particles, that is, the first particles 241 and the second particles 242. However, in the second embodiment, there are three kinds of particles, that is, the first particles 241, the second particles 242, and third particles 243, and thus k=3. In a case of the three particle groups, a first particle average radius $a_1$ is greater than a second particle average radius $a_2$, the second particle average radius $a_2$ is equal to or greater than a third particle average radius $a_3$, the difference between a free volume radius R and the first particle average radius $a_1$ is greater than the second particle average radius $a_2$, and the difference between the free volume radius R and the second particle average radius $a_2$ is greater than the third particle average radius $a_3$. Therefore, obviously, the first particle average radius $a_1$ is greater than the third particle average radius $a_3$, and the difference between the free volume radius R and the first particle average radius $a_1$ is greater than the third particle average radius $a_3$. That is, with regard to the radius of a particle, Equation 16 is satisfied.

$$a_1 > a_2 \geq a_3 \quad S_1 = 2R - 2a_1 > 2a_2 \quad S_2 = 2R - 2a_2 > 2a_3 \tag{16}$$

When this is done, since the second particles 242 and the third particles 243 are smaller than the gaps between the first particles 241, the second particles 242 and the third particles 243 easily pass through the gaps between the first particles 241, and thus the response of the electrophoretic material 24 becomes fast. At the same time, the first particles 241 are smaller than the gaps between the second particles 242 and the gaps between the third particles 243. In addition, since the third particles 243 are smaller than the gaps between the second particles 242, the third particles 243 easily pass through the gaps between the second particles 242, and thus the response of the electrophoretic material 24 becomes fast. At the same time, since the second particles 242 are smaller than the gaps between the third particles 243, the response is fast.

Equation 17 is acquired based on Equation 16.

$$2R - a_1 - a_2 > 2a_3 \quad 2R - a_1 - a_3 > 2a_2 \tag{17}$$

As understood from Equation 17, since the third particles 243 are smaller than the gaps between the first particles 241 and the second particles 242, electrophoretic response is fast. Further, since the second particles 242 are smaller than the gaps between the first particles 241 and the third particles 243, the electrophoretic response is fast.

With regard to the electric charge amount of particles, the electric charge amount $Q_1$ of the first particles 241 is less than the electric charge amount $Q_2$ of the second particles 242, and the electric charge amount $Q_2$ of the second particles 242 is equal to or less than the electric charge amount $Q_3$ of the third particles 243. As a result, the mobility $\mu_1$ of the first particles 241 is smaller than the mobility $\mu_2$ of the second particles 242, and the mobility $\mu_2$ of the second particles 242 is equal to or smaller than the mobility $\mu_3$ of the third particles 243.

With regard to three kinds of particle color, although random combination is possible, it is preferable that the three of white color, black color, red color, green color, blue color, cyan, magenta, yellow, and the like be assigned to a first color, a second color, and a third color. As described above, in the second embodiment, since it is most difficult to electrophorese the first particles 241, it is preferable that the first color be selected as white color, the third color of the third particles 243, which are most easy to electrophorese, be selected as black color, and the second color is selected from among red color, green color, blue color, cyan, magenta, yellow, and the like. Also, when the first display is performed, two pixel electrodes are prepared for each pixel, the second particles 242 are accumulated in one pixel electrode, and the third particles 243 are accumulated in the other pixel electrode.

As described above, according to the electrophoretic material 24 and the electrophoresis display device 150 according to the second embodiment, it is possible to acquire the following advantages in addition to the advantages of the first embodiment. Since the composition is structured such that three kinds of particles do not mutually disturb the electrophoresis, it is possible to implement high-speed response with regard to the variation in electric fields in the electrophoresis display device using the three kinds of particles.

Also, the invention is not limited to the above-described embodiments, and it is possible to add various modifications and improvement to the above-described embodiments. Modification examples will be described below.

First Modification Example

First Form Having Different Electric-Proof Process

Figure 11B:
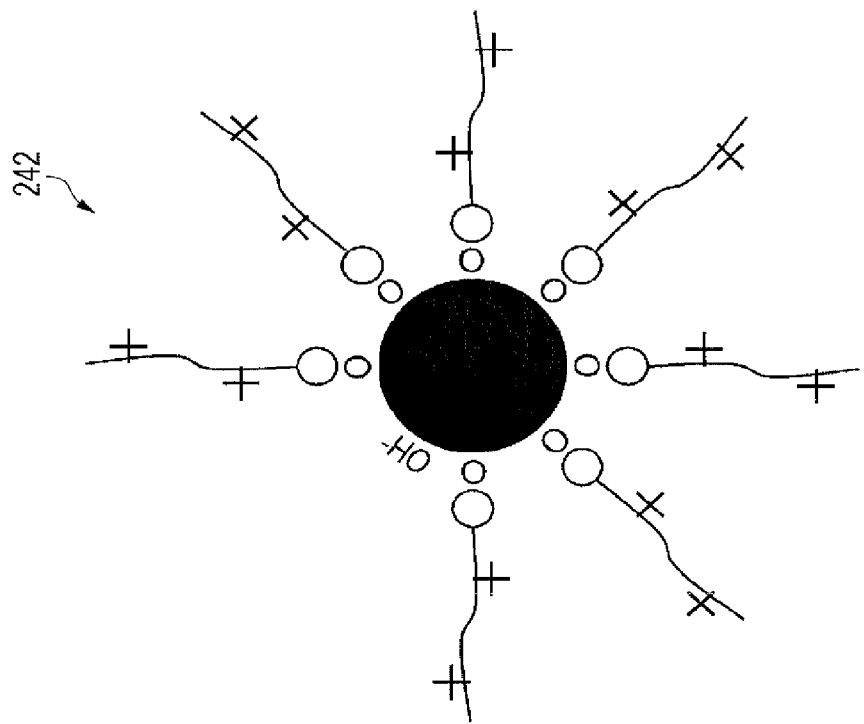
FIGS. 11A and 11B are views illustrating electrophoretic material according to a first modification example.
Figure 11A:
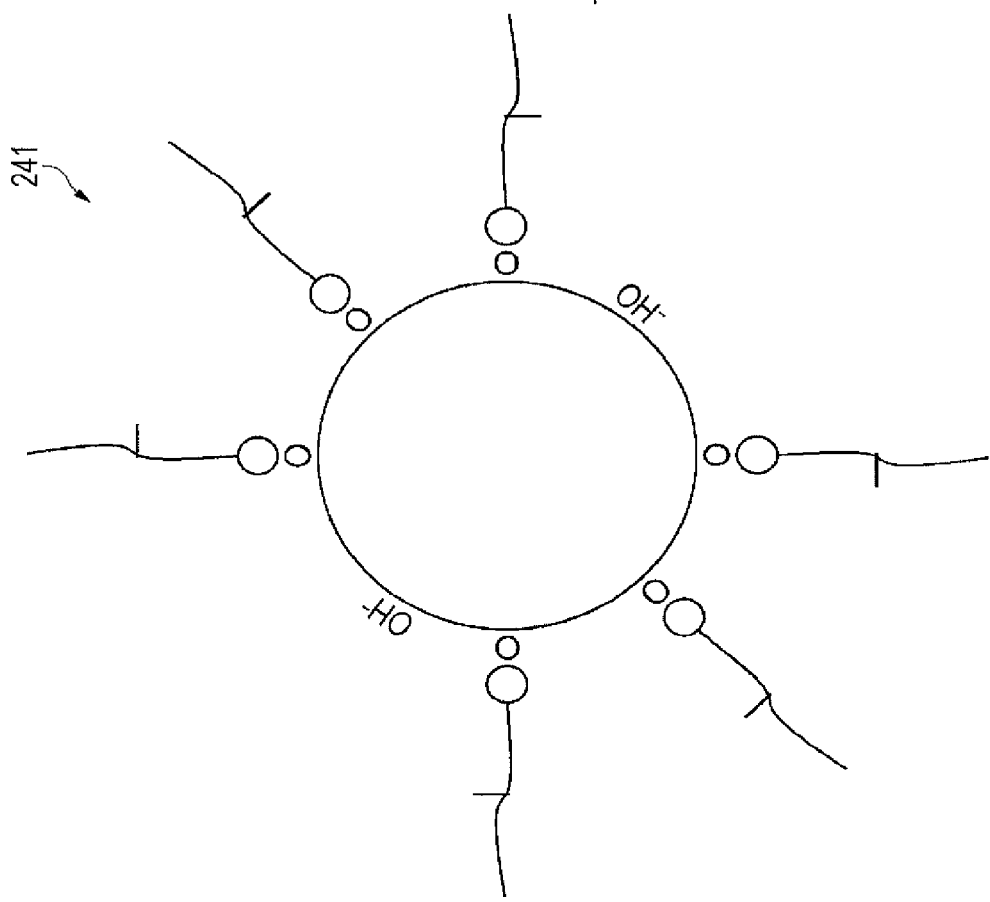

FIGS. 11A 11B are views illustrating an electrophoretic material according to a first modification example. FIG. 11A illustrates a first particle, and FIG. 11B illustrates a second particle. Hereinafter, an electrophoretic material 24 according to the first modification example will be described. Also, the same reference numerals are used for the same components as in the first embodiment, and the description will not be repeated.

The first modification example (FIGS. 11A and 11B) is different from the first embodiment (FIGS. 6A and 6B) in that a different electric-proof process is performed on a particle. The other configurations are almost the same as in the first embodiment. In the first embodiment (FIGS. 6A and 6B), the surfaces of the first particles 241 are coated with the polymer molecules having the non-polarity (non-polarity polymer molecules), the surfaces of the second particles 242 are coated with the polymer molecules which include the functional group having the second polarity. In contrast, in the first modification example, the surfaces of the first particles 241 are coated with the polymer molecules which include the functional group having the first polarity. With this, the first particles 241 may be charged with the first polarity.

As shown in FIG. 11A, the functional polymer molecules of the surface preparation agent which coats the first particle 241 are the polymer molecules which include the functional group having the first polarity. As an example, the polymer molecules which include the functional group having the first polarity are the polymer molecules which include a carboxyl group. Although the surface hydroxyl group which is originally present on the surface of the first particle 241 is reduced through the covalent coupling with the silane coupling agent, the surface of the first particle 241 is coated with the polymer molecules which include the functional group having the first polarity. The functional group having the first polarity is disassociated and is negatively charged. In this way, the electric charge amount of the first particles 241 is controlled.

As shown in FIG. 11B, although the functional polymer molecules of the surface preparation agent which coats the second particle 242 are the polymer molecules which include the functional group having the second polarity, control is made such that the electric charge amount of the second particles 242 is greater than the electric charge amount of the first particles 241 by increasing the amount of the second polarity groups in the polymer molecules. In this way, it is possible to control the positive electric charge amount based on the amount of coated surface preparation agent.

Second Modification Example

Second Form Having Different Electric-Proof Process

FIGS. 12A and 12B are views illustrating an electrophoretic material according to a second modification example. FIG. 12A illustrates a first particle, and FIG. 12B illustrates a second particle. Hereinafter, an electrophoretic material 24 according to the second modification example will be described. Also, the same reference numerals are used for the same components as in the first embodiment, and the description will not be repeated.

The second modification example (FIGS. 12A and 12B) is different from the first embodiment (FIGS. 6A and 6B) in that a different electric-proof process is performed on a particle. The other configurations are almost the same as in the first embodiment. In the first embodiment (FIGS. 6A and 6B), the surface of the first particle 241 is coated with the polymer molecules having the non-polarity (non-polarity polymer molecules), the surface of the second particle 242 is coated with the polymer molecules which include the functional group having the second polarity. In contrast, in the second modification example, the surface of the first particle 241 and the surface of the second particle 242 both are coated with the non-polarity polymer molecules. However, a coating ratio of the surface of the first particle 241 is different from a coating ratio of the surface of the second particle 242. In this way, the charged polarities and the electric charge amount of the first particle 241 and the second particle 242 may be controlled.

As shown in FIGS. 12A and 12B, the surfaces of the first particle 241 and the second particle 242 are coated with the non-polarity polymer molecules, the coating rate of the surface of the first particle 241 by the non-polarity polymer molecules is greater than the coating rate of the surface of the second particle 242 by the non-polarity polymer molecules. If particles are dispersed in the solvent, there occurs an electric charge separation phenomenon, which moderates work function difference between the particles and the solvent, and thus the particles are charged. In FIGS. 12A and 12B, the first particle 241 and the second particle 242 both are positively charged. At the same time, the particles are negatively charged due to the disassociation of the surface hydroxyl group. On the other hand, if the non-polarity polymer molecules are adsorbed to the hydroxyl group of the surface of the particles and reacts thereon, the negative charge of the particles due to the hydroxyl group is neutralized. Therefore, it is possible to charge the first particles 241 with the first polarity, to charge the second particles 242 with the second polarity, and to cause the electric charge amount of the second particles 242 to be greater than the electric charge amount of the first particles 241 by varying the coating rate due to the non-polarity polymer molecules in the first particles 241 and the second particles 242.

This application claims the benefit of Japanese Patent Application No. 2012-157224, filed on Jul. 13, 2012, which is hereby incorporated by reference as if fully set forth herein.

What is claimed is:

1. An electrophoretic material, wherein:
   particles are dispersed in a solvent, volume, which is obtained by dividing a volume of the solvent by a total number of particles, is called free volume, and a radius of a spherical space, which is occupied by sum of an average volume of the particles and the free volume, is called a free volume radius,
   the particles include at least first particles which are charged with a first polarity and second particles which are charged with a second polarity, an average radius of the first particles is called a first particle average radius, and an average radius of the second particles is called a second particle average radius,
   the first particle average radius is greater than the second particle average radius; and
   a difference between the free volume radius and the first particle average radius is greater than the second particle average radius,
   the particles include third particles,
   an average radius of the third particles is called a third particle average radius,
   the second particle average radius is equal to or greater than the third particle average radius, and
   a difference between the free volume radius and the second particle average radius is greater than the third particle average radius.

2. The electrophoretic material according to claim 1, wherein surfaces of the second particles are coated with polymer molecules which include a functional group having the second polarity.

3. The electrophoretic material according to claim 1, wherein surfaces of the first particles and the second particles are coated with non-polarity polymer molecules, and
   wherein a coat ratio due to the non-polarity polymer molecules on the surfaces of the first particles is greater than a coat ratio due to the non-polarity polymer molecules on the surfaces of the second particles.

4. The electrophoretic material according to claim 1, wherein the first particles have white color, and the second particles have color which is different from the white color.

5. The electrophoretic material according to claim 4, wherein a volume concentration of the first particles is greater than a volume concentration of the second particles.

6. The electrophoretic material according to claim 4, wherein a ratio of a refractive index of the first particles to a refractive index of the solvent is greater than 1, and
   wherein the first particle average radius is in a range which is equal to or greater than 0.05 μm and equal to or less than 0.4 μm.

7. The electrophoretic material according to claim 6, wherein the first particle average radius is in a range which is equal to or greater than 0.1 μm and equal to or less than 0.15 μm.

8. The electrophoretic material according to claim 4, wherein the first particles are resin which includes an optical interface therein.

9. The electrophoretic material according to claim 8, wherein the first particles include gaps therein.

10. The electrophoretic material according to claim claim 1,
    wherein an electric charge amount of the second particles is equal to or less than an electric charge amount of the third particles.

11. The electrophoretic material according to claim 10, wherein the electric charge amount of the second particles is greater than an electric charge amount of the first particles.

12. An electrophoresis display device comprising:
    the electrophoretic material according to claim 1.

13. An electronic apparatus comprising:
    the electrophoresis display device according to claim 12.

* * * * *